Dec. 30, 1969    E. E. GARDNER ET AL    3,487,301
MEASUREMENT OF SEMICONDUCTOR RESISTIVITY PROFILES BY MEASURING
VOLTAGES, CALCULATING APPARENT RESISTIVITIES
AND APPLYING CORRECTION FACTORS
Filed March 4, 1968                               2 Sheets-Sheet 1
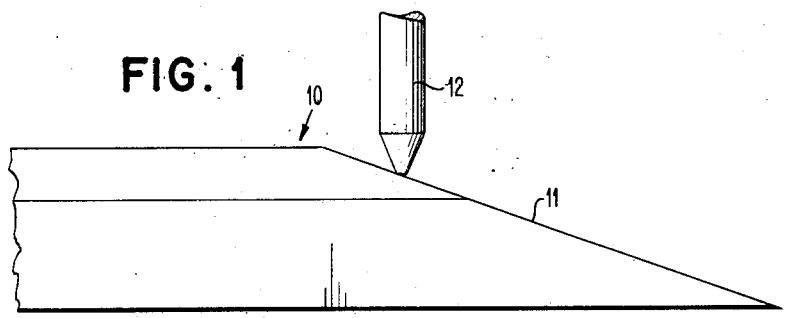
FIG. 1
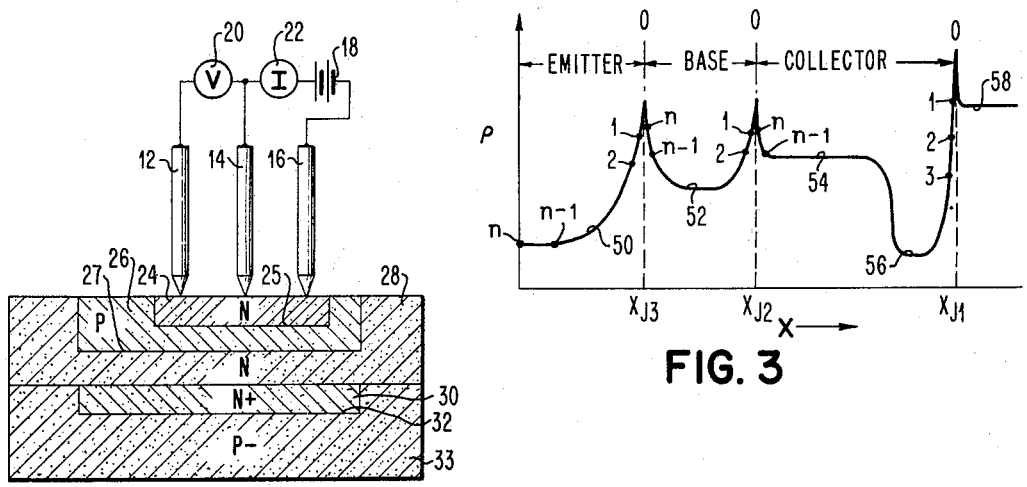
FIG. 2
FIG. 3
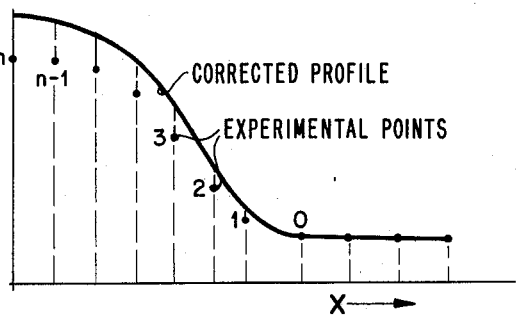
FIG. 5
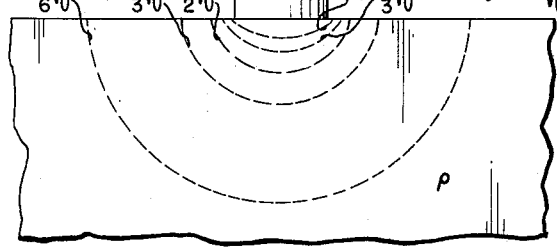
FIG. 4
INVENTORS
EDWARD E. GARDNER
EDWARD F. GOREY
PAUL A. SCHUMANN, JR.
TSU-HSING YEH
BY Wolmar J. Stoffel
ATTORNEY

UNCORRECTED SPREADING RESISTANCE PROFILE

United States Patent Office 3,487,301
Patented Dec. 30, 1969

3,487,301
MEASUREMENT OF SEMICONDUCTOR RESISTIVITY PROFILES BY MEASURING VOLTAGES, CALCULATING APPARENT RESISTIVITIES AND APPLYING CORRECTION FACTORS
Edward E. Gardner, Poughkeepsie, Edward F. Gorey, Beacon, Paul A. Schumann, Jr., Wappingers Falls, and Tsu-Hsing Yeh, Poughkeepsie, N.Y., assignors to International Business Machines Corporation, Armonk, N.Y., a corporation of New York
Filed Mar. 4, 1968, Ser. No. 710,297
Int. Cl. G01r 27/14
U.S. Cl. 324—64    11 Claims

ABSTRACT OF THE DISCLOSURE

In the method of determining resistivity profiles of multilayered semiconductor devices, the region of interest is exposed, a current flow is established, and the voltage measured between a current probe and a spaced voltage probe. Knowing the current, voltage, and size of the probe permits evaluation of apparent resistivity. A plurality of apparent resistivity determinations are taken at spaced intervals in the region of interest. The resultant resistivity values are revised by application of a correction factor which is based on information of measured resistivities of adjacent points, distance, and effective radius of contact of the probe.

BACKGROUND OF THE INVENTION

Semiconductor technology is becoming increasingly more sophisticated. Semiconductor devices, especially integrated circuit devices, are becoming increasingly smaller and more complex necessitating greater precision in fabrication techniques and processes. The miniaturization and also the demand for greater individual device performance, especially higher switching speeds, have created the need for higher precision and increased control in semiconductor manufacturing processes. In order to exercise greater control over manufacturing processes, it is imperative that the resultant product be analyzed with a high degree of precision. Particularly important is the obtaining of information relative to impurity concentrations and region identification and configuration, commonly designated as impurity profiles.

Various methods are available for obtaining information about the structure of semiconductor devices. However, the known methods, though generally suitable for determining bulk resistivity, and evaluation of older large scale semiconductor products, are generally unsatisfactory for analyzing modern miniaturized semiconductor devices.

The Hall effect has been used to determine impurity concentrations. A semiconductor ingot is cut into wafers, faces ground thereon so that a uniform thickness is obtained, and the resultant wafer shaped for use as a Hall bridge. With leads soldered to the bridge, Hall voltage measurements can be taken and the carrier concentration calculated. This technique is very time consuming, and useful only for determining bulk resistivity or average impurity concentration.

Optical techniques for the measurement of impurity concentrations in semiconductor materials are known. This technique is described in U.S. Patent 3,109,932 and consists basically of measuring the dependents of wavelength of a minimum reflectivity to infrared radiation with concentrations of a known predominant impurity, and then measuring the wavelength of minimum reflectivity in a test sample to determine the concentration in the test sample. This technique is time consuming and is useful only for determining relatively high impurity concentrations that is concentration above $10^{18}$ atoms per cm.$^3$. Layers can be etched from the surface of the device being analyzed and subsequent readings taken to determine the impurity concentration as a function of depth. This technique, however, cannot be used for defining the location of PN junctions since or ordinarily the impurity concentration at the junctions is below the concentration level that can be measured.

Another technique for determining impurity concentration in a semiconductor is the diode capacitance method. In this method, a shallow step junction or diffusion is formed in the wafer to be tested and the capacitance is measured as a function of a reverse bias voltage. The impurity concentration can be calculated from the resultant capacitance versus voltage curves. This technique, however, cannot be used when there is a junction present in the region to be tested. Further, it is good only for low impurity concentrations.

Another technique which can be used to measure the impurity concentration is the sheet conductance method. In this method the sheet conductance is measured with a four-point probe, a layer of the surface is removed, and a second sheet conductance is measured. The difference between these two values, divided by the thickness of the layer removed, gives the average sheet conductance of the removed layer. The surface concentration is then determined from plots of sheet conductance versus impurity concentration. This technique has limited applicability since it is quite time consuming, and requires a test sample. The impurity concentration of an actual integrated circuit device cannot be measured directly. For example, the minimum area on which the test can be applied is on the order of a one-fourth inch square. In contrast, an active device in an integrated circuit device occupies approximately $2 \times 10^{-5}$ square inches, or approximately 1/10,000 of the area required. Another limitation to this method is that there can be only one isolation junction since the layers are commonly removed by anodic oxidation. Conventional etching is not practical since the depth of the etch cannot be controlled with sufficient accuracy.

The impurity concentration can also be determined by the neutron activation analysis technique. In this technique the impurities to be diffused are made radioactive by neutron bombardment. The diffusion is then made and the radioactivity of the layer removed from the surface is determined. The surface impurity concentration is determined by appropriate calibration procedures. This technique is quite time consuming and very elaborate equipment and facilities are necessary to carry out the process. Still further, the results give the total impurity concentration rather than the electrically active impurity concentration. Still further, this technique does not work with boron in silicon.

In all of the aforementioned techniques for determining impurity concentration in semiconductors, a test sample corresponding to the semiconductor being investigated is necessary in order to perform the analysis techniques. The techniques require a relatively large area to obtain the results. These techniques are not applicable to the evaluation and investigation of actual integrated circuit devices and other miniaturized semiconductor devices.

The general spreading resistance technique for measuring impurity concentration is known. In this technique two probes in contact with the semiconductor material to be analyzed supply a current across a localized area of the test specimen. The spreading resistance voltage is measured between one of the current probes and a third probe. The resistivity is then determined from a consideration of the measured voltage, measured current, and the effective contact radius of the voltage or third probe. The impurity concentration can readily be determined from a knowledge of the resistivity values. This technique is very useful since it is applicable to measuring small volumes of the sample, can be used to measure a wide range of impurity concentrations from very low to very high resistivities, and is a rapid method of making measurements.

DESCRIPTION OF THE INVENTION

It is an object of this invention to provide a new method particularly adapted for determining resistivity profiles of multilayered semiconductor device structures.

Yet another object of this invention is to provide a new method for determining resistivity profiles and impurity profiles of miniature semiconductor devices which embody closely spaced PN junctions, and widely varying impurity concentrations in the various regions of the device.

In accordance with the aforementioned objects, the method comprises exposing at least a portion of the region of the device to be investigated, establishing a current flow in the device with spaced probes in contact with the surface of the exposed region, measuring the spreading resistance voltage with a voltage probe at a first point on the device in the same region of the current flow, determining the apparent resistivity of the material from a consideration of measured voltage, measured current, and a consideration of the psysical dimensions of the voltage probe, making a series of spaced apparent resistivity determinations in the region to be investigated, sequentially applying a correction factor to the apparent resistivity determinations which is based at least in part on the information adjacent points, and the distance between the points, and plotting the revised resistivities versus distance.

The method of the invention makes possible the actual determination of an impurity profile or resistivity profile of multilayer devices. While the general technique of measuring resistivities by the spreading resistance technique is known, it could not be utilized in devices having multilayered structures because the potential distribution of the probe was distorted by the layer and the varying impurity distribution. This distortion caused significant errors in the known testing techniques. This method provides a technique which takes the potential distribution distortion into consideration and corrects accordingly. Further, the method as known to the prior art is applicable for measuring impurity concentrations of only single layers. Presently known techniques are incapable of interpreting results from multiple layer structures.

BRIEF DESCRIPTION OF THE DRAWINGS

The foregoing and other objects, features, and advantages of the invention will be apparent from the following more particular description of the preferred embodiments of the invention.

In the drawings:

FIGURE 1 is a side elevational view of a semiconductor that has been beveled to expose the region of interest in combination with the contact probes.

FIGURE 2 is a side elevational view of FIGURE 1 illustrating the various regions of the device in cross section and includes a schematic representation of a probe arrangement for practicing the method of the invention.

FIGURE 3 is a plot of resistivity versus distance which depicts a typical resistivity profile which might be obtained from the device shown in FIGURE 2.

FIGURE 4 is a fragmentary view of the tip of a probe element contacting the surface of a semiconductor device which illustrates the potential distribution of a current probe on a semi-infinite solid of homogenous resistivity.

FIGURE 5 is a plot of resistivity versus distance depicting a simple resistivity profile of an epitaxial layer deposited on a substrate of the same type which illustrates the experimental points and also the corrected profile as determined by the practice of the invention.

DESCRIPTION OF THE PREFERRED EMBODIMENT

Figure 6:
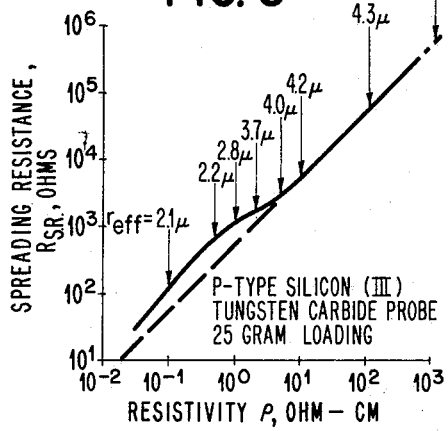
FIGURE 6 is a typical calibration curve $<111>$ oriented P type silicon being a plot of spreading resistance versus resistivity on which is indicated the effective radius of contact of the probe.

Apparatus for carrying out the method of the invention and its relationship to the device being investigated is shown in FIGURES 1 and 2 of the drawing. As indicated in FIGURE 1, the device 10 of which an impurity profile is desired is beveled to expose the surface 11 of the region to be investigated. The angle of the beveled surface with the bottom surface can be any suitable angle so as to expose the region of interest. Typically, the angle varies from one to five degrees. In practice, the device 10 after it has been beveled is placed in bevel blocks which presents surface 11 to probes 12, 14, and 16. The relationship of the probes and beveled surface in FIGURE 1 is shown schematically. However, in practice it would be desirable to position the probes substantially perpendicular to surface 11. As indicated in FIGURE 2, a DC source 18 is connected between probes 14 and 16. The DC source can be constructed from batteries and a angle varies from one to five degrees. In practice, the network of resistors. A current is introduced into the region of the device by probes 14 and 16, which current varies from $10^{-8}$ to $10^{-3}$ ampere. Probe 12 is the voltage probe. Voltmeter 20 is provided to measure the voltage potential between probe 14 and voltage probe 12. Ammeter 22 indicates the current flow between probes 14 and 16 and serves as a means for monitoring same. Although not shown, a suitable switch is provided for reversing the current flow through probes 14 and 16. Current enters and leaves the sample through probes 14 and 16 and the potential difference is measured between probe 12 and probe 14. The probe spacing can be any suitable spacing which is very large in comparison to the contact radius of the probes typically on the order of 25 mils. The probe loading is maintained as uniform as possible through a set of measurements and is typically in the range of 25 to 85 grams.

FIGURE 3 illustrates a typical resistivity profile which might be expected from the device illustrated in FIGURE 2. The resistivity at the surface of emitter 24 is relatively low because the impurity concentration is relatively high. The resistivity increases adjacent PN junction 25 which is clearly illustrated by the first peak in the graph illusrtated in FIGURE 3. The resistivity profile of emitter 24 is depicted by curve portion 50. The resistivity in base region 26 decreases in the center portion and again increases in the region adjacent PN junction 27. The resistivity profile of the base 26 is depicted by curve portion 52. The profile indicates two separate portions in the collector region 28. The resistivity is relatively constant in the portion immediately adjacent the base region as indicated by portion 54, of the curve and then markedly decreased in the sub-collector region 30 as indicated by portion 56 of the curve of FIGURE 3. The resistivity again increases adjacent to the PN junction 32. Below PN junction 32 the resistivity of the base of the device 33 is relatively constant as indicated by portion 58 of FIGURE 3.

It has been shown that the constriction of current near a flat equipotential contact of radius $r_0$ on a semi-infinite solid of resistivity $\rho$ results in the potential distribution illustrated in FIGURE 4. From this figure, which is drawn roughly to scale, it is apparent that most of the potential drop occurs within the distance of 1.5 $r_0$ from the center of the contact. This is generally the potential distribution of current probe 14 illustrated in FIGURE 2 when in contact with a material of uniform impurity concentration and absent nearby PN junctions. If the potential difference is measured between this probe and the third probe, and the distance between the probe is great in relation to the radius $r_0$ of probe 14, the spreading resistance or apparent resistance is given by the expression $$R_{sr} = \frac{V}{I}$$

The correlation between spreading or apparent resistance and resistivity $\rho$ is given by the expression $$\rho = 4r_0 \frac{V}{I}$$

Here $\rho$ is the resistivity of the semi-infinite semiconductor material, V is the measured voltage between a voltage probe and one of the current probes, I is the current, and $r_0$ is the radius of the current probe. Assuming that $r_0$ is known and that the potential difference V and current I are measured, then the apparent resistivity can be determined.

In the actual case when one attempts to determine the impurity profile of a semiconductor device having very thin regions separated by PN junctions and where the resistivity of the thin regions varies the equipotential lines illustrated in FIGURE 4 will be distorted. In such an instance the actual resistivity is no longer given by the above expression and it is necessary to apply correction factors.

A number of considerations, assumptions, and conditions govern the accuracy and usefulness of the technique of the invention. When the point of a probe is brought into contact with a sample to be tested, both the point and the sample deform. Since neither are perfectly smooth or clean, the area of contact between the two is not uniform. The contact is usually made up of a collection of small contact areas. It is assumed in the practice of the method of the invention that the collection of small contact areas can be treated together as a single contact having an effective radius $a$.

In general, a small area metal-semiconductor contact is theoretically not ohmic. Experience has shown that in most cases if low current levels are used, the resistance of the contact is not a function of current direction or magnitude.

In silicon, particularly, it is obvious that there is always present an oxide of silicon on the surface. This effect is taken into consideration by utilizing what is characterized by an effective radius of contact of the probe.

In the practice of the invention it is necessary to use low current levels because of heating effects, high field effects, and junction effects. For purposes of determining the correction factor it is assumed that the resistivity associated with each measurement is homogenous throughout the associated layer. In actual practice, however, the resistivity varies. This assumption is a mathematical approximation to reality.

The probes, more particularly the tips of the probes, preferably are made of a material that has a relatively good conductivity and is capable of withstanding high temperatures. Suitable metals include osmium, osmium alloy, ruthenium alloy, tungsten carbide alloy, and tungsten. In general, the probe tip radius is on the order of 0.75 mil.

The effective radius of contact, which is significantly different from the actual radius of the tip of the probe, can be determined experimentally. FIGURE 6 depicts a plot of spreading resistance versus resistivity for a tungsten carbide probe having a loading of 25 grams on P-type silicon. As the curve indicates, the effective radius of contact varies with resistivity. The effective radius of contact can be determined from measurements of the spreading resistance on bulk wafers of known resistivity. Spreading resistance voltage measurements are taken on each of the wafers and the resistivity calculated. The curve can thus be plotted on the graph which sets forth the correlation between spreading resistance and resistivity. The effective radius of contact at various points on the curve can be calculated utilizing the expression, $$a = \frac{\rho}{4R_{sr}}$$

where $\rho$ is the resistivity, and $R_{sr}$ is the spreading resistance. With a contact force of 25 grams it has been noted that the effective radius of contact varies between 0.75 to 2.5 microns for N type silicon and between 2.0 to 4.4 microns for P type silicon.

The loading of the probe must be as uniform as possible during each voltage measurement. Also the loading must be consistently maintained throughout the entire series of measurements. After each measurement, the probes are moved a slight increment of depth distance. Each measurement produces a very small damaged area. It is helpful that the probes be moved along the surface of the semiconductor in a zigzag fashion so that the damaged areas do not overlap. During the taking of the measurements, the semiconductor, as well as the probes, must be supported on a vibration free mount in order to obtain consistent readings. During the taking of a voltage measurement, the current is caused to flow between terminal probes 14 and 16 in one direction while a voltage measurement is taken with probe 12. Subsequently, the current flow between probes 14 and 16 is reversed and a second voltage measurement taken. The voltage measurements are then averaged. The current flow is maintained at the same value.

In practicing the method, the region of interest of the device is exposed by either beveling or sequential etching of layers. Beveling the device to expose the region produces an elongation of the depth profile. However, the region can also be exposed by etching a thin layer off the surface of the device, taking a measurement, etching another layer, taking a measurement, and thus continuing to alternately etch and measure until the region of the device of interest has been penetrated. After each measurement, a knowledge of the voltage and current amperage permits calculation of the spreading resistance. By knowing the spreading resistance, the resistivity as well as the effective radius of contact can be determined from a graph similar to FIGURE 6. Preparation of this graph has been described previously. The graph illustrated is directly related to a particular type of probe. Changing of the probe tip or size necessitates the replotting of the relationship. Plotting the series of spaced resistivities will indicate the locations of PN junctions since such will be depicted as spikes on the curve, illustrated in FIGURE 3. Since each resistivity determination is directly influenced by the physical characteristics of the immediately adjacent resistivity layer as measured by the adjacent point, the information provided by this point must be utilized in determining a correction factor which will be applied to the point under consideration.

The correction of the resistivity determined from the spreading resistance voltage measurment can be corrected by the application of a correction factor in two general techniques. When the structure of the device has therein two adjacent regions of differing impurity concentrations of the same type, which would be indicated generally by the profile depicted in FIGURE 5. A point within such a device where the impurity concentration is constant and there are no adjacent PN junctions can serve as the starting point. Alternately, the starting point can be located directly on the PN junction where the resistivity of the material is relatively high. In FIGURE 3 a logical starting point is the junction 32 between buried sub-collector 30 and base 33. At either of such starting points a correaction factor is essentially unity. The spreading resistance is then measured at the point immediately adjacent the starting point, a correction factor determined based on the information of the starting point and a revision made to the resistivity. Spreading resistance measurements are then sequentially made at increments spaced from the starting point and the information, as revised by the correction factor of the previous points, utilized to correct the point under consideration. This procedure is followed until the region of interest of the device has been investigated. A plot of resistivity versus distance can then be made with the information so derived. If desired, the resistivities of the material at the various points can be converted to impurity concentration using Irvin's curves.

Figure 8:
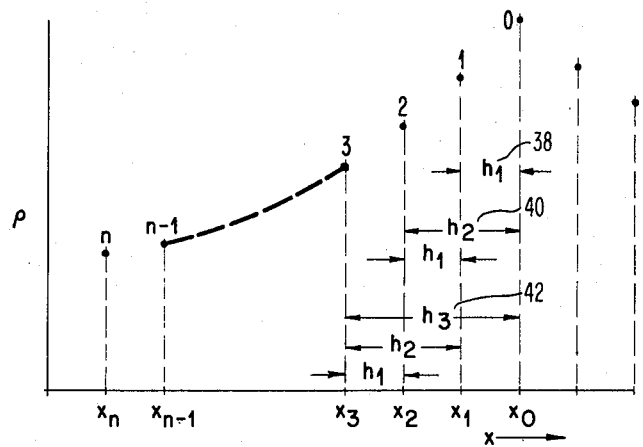
FIGURE 8 is a plot of resistivity versus depth in a semiconductor device illustrating a series of experimentally determined resistivity points and layer thicknesses used in the determination of the correction factor in the first embodiment of the method of the invention.

In explaining the determination of the correction factor used to revise the experimentally determined values of resistivity, reference is made to FIGURE 8 of the drawings. FIGURE 8 is a plot of apparent resistivity versus distance or depth in a semiconductor. The profile depicted is typical of one obtained when an impurity is diffused into a semiconductor substrate and the diffused region is of the opposite type from the substrate. Each of the numbered points represent an apparent resistivity determination derived from a spreading resistance voltage measurement. The point indicated as zero indicates the location of the PN junction. The points are spread out along the distance axis for ease of illustration. In actual practice the points would be closer together. The first point considered labeled 0 is located at the junction and is assumed to have an infinite resistance. The first point to be corrected is labeled 1. This layer has a thickness $h_1 = x_0 - x_1$, and is assumed to be of uniform resistivity $x_0$ and $x_1$ are indicated on the $x$ axis of the plot of FIGURE 8. From a determination of spreading resistance $R_{sr}$ at point 1 the apparent resistivity and effective radius of contact $a$ is determined from the relationship indicated in FIGURE 6. In the following explanation, the resistivity of the specific layer under consideration is indicated by the corresponding subscript indicated on the plot of FIGURE 8. For example, the resistivity in the layer between the points zero and one will be indicated at $\rho_{10}$. The correction factor C.F. can be calculated for the first layer from the following expression:

$$C.F._{\cdot 1} = \frac{4}{\pi} \int_0^\infty \theta_1' \left(\frac{t}{a}\right) \sin t \left[\frac{J_1(t)}{t^2} - \frac{J_0\left(\frac{S'}{2}t\right)}{t} + \frac{J_0(s't)}{2t}\right] dt$$

Where $a$ is the effective radius of contact of the probe, $h_1$ is the layer thickness associated with the resistivity determination, and $H_1$ is equal to $h_1/a$, $S'$ is equal to $2s/a$, $t$ is equal to $\lambda a$, where $\lambda$ is a variable of integration, $J_0$ and $J_1$ are bessel functions, and $s$ is probe spacing. The thickness $h$, used in the calculation of C.F. for the first point is indicated by numeral 38. For the single layer being corrected $$\theta_1' = \frac{1 + k_1 e^{-2H_1 t}}{1 - k_1 e^{-2H_1 t}} = \frac{1 + e^{-2H_1 t}}{1 - e^{-2H_1 t}}$$

Upon determining the correction factor, the resistivity is corrected in accordance with the following expression $$\rho_{10} \text{ (corrected)} = \frac{\rho_{10}}{C.F.}$$

This corrected resistivity value may then be used to find a new effective radius of contact $a$ and then a new correction factor and a new corrected resistivity. Thus procedure is continued until the resistivity $\rho_{10}$ (corrected), has a constant value.

When the resistivity $\rho_{10}$ for the first layer has been obtained, then the next resistivity value for point 2 is corrected. The spreading resistance voltage at point 2 is measured and the apparent resistivity calculated in the manner previously described. An effective radius of contact $a$ is again determined from a plot similar to that depicted in FIGURE 6 in which the effective radius of contact has been previously determined from the expression $$a = \frac{\rho}{4 R_{sr}}$$

The correction factor is again computed utilizing the previous expression. For the two layer case $$_n\theta_1' = {}_2\theta_1' = \frac{1 + k_2 e^{-2H_2 t} + k_1 e^{-2H_1 t} + k_2 k_1 e^{-2(H_2 - H_1)t}}{1 - k_2 e^{-2H_2 t} - k_1 e^{-2H_1 t} + k_2 k_1 e^{-2(H_2 - H_1)t}}$$

$$k_2 = \frac{\rho_{10} \text{ (corrected)} - \rho_{20}}{\rho_{10} \text{ (corrected)} + \rho_{20}}$$

and $$k_1 = \frac{\rho_0 - \rho_{10} \text{ (corrected)}}{\rho_0 + \rho_{10} \text{ (corrected)}} = 1$$

The values of $H_2$ and $H_1$ are $$H_1 = \frac{h_1}{a}$$

and $$H_2 = \frac{h_2}{a}$$

where $h_2 = x_0 - x_2$ and $h_1 = x_1 - x_2$.
Sets of $h_1$ and $h_2$ for this correction factor is graphically depicted as 40 in FIGURE 8. $H_1$ and $H_2$ are indicated on FIGURE 8. By routine algebraic manipulation $$H_2 - H_1 = \frac{x_0 - x_1}{a}$$

The corrected value of the resistivity of the second point is determined by the expression $$\rho_{20} \text{ (corrected)} = \frac{\rho_{20}}{C.F.}$$

Again it may be necessary to find a new effective radius of contact $a$ from the corrected resistivity and repeat the procedure. Once a constant resistivity value for the second point is found, the next point number 3 is corrected by the same procedure. We now have a three layer problem for finding the correction factor with $$_n\theta_1' = {}_3\theta_1' = \frac{A_3}{B_3}$$

where $$A_3 = 1 + k_3 e^{-2H_3 t} + k_2 e^{-2H_2 t} + k_1 e^{-2H_1 t}$$
$$+ k_3 k_2 e^{-2(H_3 - H_2)t} + k_3 k_1 e^{-2(H_3 - H_1)t} + k_2 k_1 e^{-2(H_2 - H_1)t}$$
$$+ k_3 k_2 k_1 e^{-2(H_3 - H_2 + H_1)t}$$

and $$B_3 = 1 - k_3 e^{-2H_3 t} - k_2 e^{-2H_2 t} - k_1 e^{-2H_1 t}$$
$$+ k_3 k_2 e^{-2(H_3 - H_2)t} + k_3 k_1 e^{-2(H_3 - H_1)t} + k_2 k_1 e^{-2(H_2 - H_1)t}$$
$$- k_3 k_2 k_1 e^{-2(H_3 - H_2 + H_1)t}$$

and $$h_3 = x_0 - x_3 \quad H_3 = h_3/a$$
$$h_2 = x_1 - x_3 \quad H_2 = h_2/a$$
$$h_1 = x_2 - x_3 \quad H_1 = h_1/a$$

The set of distances $h_3$, $h_2$, and $h_1$ for the point 3 calculation are identified in FIGURE 8 by numeral 42. The values of $k_2$ and $k_3$ are as follows:

$$k_2 = \frac{\rho_{10} \text{ (corrected)} - \rho_{20} \text{ (corrected)}}{\rho_{10} \text{ (corrected)} + \rho_{20} \text{ (corrected)}}$$

$$k_3 = \frac{\rho_{20} \text{ (corrected)} - \rho_{30}}{\rho_{20} \text{ (corrected)} + \rho_{30}}$$

The general procedure for correcting experimental points is continued until the surface of the device is reached. The main difference in correcting the various points occurs in the correction factor term:

$$_n\theta_1^1 = \frac{A_n}{B_n}$$

For the $n$th layer solution for determining the correction factor:

$$A_n = \sum_{P_1=0}^{n} \sum_{P_2=0}^{P_1-1} \sum_{P_3=0}^{P_2-1} \cdots \sum_{P_n=0}^{P_{n-1}-1} [k_{P_1} k_{P_2} k_{P_3} \cdots k_{P_n}]$$

$$[e^{-2HP_1 t} e^{+2HP_2 t} e^{-2HP_3 t} \cdots e^{\pm 2HP_n t}]$$

where the last sign is minus if $n$ is odd and is positive if $n$ is an even number of layers.

$$B_n = \sum_{P_1=0}^{n} \sum_{P_2=0}^{P_1-1} \sum_{P_3=0}^{P_2-1} \cdots \sum_{P_n=0}^{P_{n-1}-1} [k'_{P_1} k'_{P_2} k'_{P_3} \cdots k'_{P_n}]$$

$$[e^{-2HP_1 t} e^{+2HP_2 t} e^{-2HP_3 t} \cdots e^{\pm 2HP_n t}]$$

The value of $k_1$ was given previously. The definition of the $k$'s are:

$$k_{P_n} = \frac{\rho_{P_{n-1}} - \rho_{P_n}}{\rho_{P_{n-1}} + \rho_{P_n}} = -k'_{P_n} \text{ for } P_n > 0$$

and $$k_{P_n} = -k'_{P_n} = 1, \ e^{\pm 2HP_n t} = 1$$

for $$P_n = 0$$

The previous solution was worked out for a diffused layer which has a junction existing between the diffused layer and substrate. In the event that the structure being investigated has an epitaxial layer grown on a substrate of the same type, there will be no PN junction and therefore no peak in the curve as depicted in FIGURE 8. In the determination of the resistivity profile of a structure without a PN junction, the starting point is a point in the region of constant resistivity. A profile which is generally descriptive of such a structure is depicted in FIGURE 5 of the drawings. The point on the graph of FIGURE 5 is a labeled zero and is the starting point and is in the substrate region and does not require correction. However, the point labeled 1 and all succeeding points do need correction. The same expression as set forth previously is used in computing the correction factors C.F. The spreading resistance voltage is then sequentially measured at the points indicated on FIGURE 5, the points corrected to indicate the actual resistivity values at the respective points, and the results plotted.

In the aforedescribed embodiment of the method of the invention, it should be noted that correction of the spreading resistance profile points start at a known resistivity point, either a junction or a substrate. The resistivity of the layer next to the known point is corrected to the required degree of precision, then the layer next to the corrected one, etc., until the surface of the structure is reached.

Further, the correction factor takes into account the previously corrected data. For example, in the set of $h$'s indicated as numeral 42 which relates to the correction of point 3, three layers $h_1$, $h_2$, and $h_3$ are included in the expression used to determine the correction factor. In essence, layer $h_1$ is assumed to have a uniform resistivity given by the resistivity determined at point 0. Layer $h_2$ is assumed to have a uniform resistivity given by the corrected resistivity determined at point 1. Layer $h_3$ is assumed to have a uniform resistivity given by the corrected resistivity determined at point 2. The set of layers is merely expanded when additional points nearer the surface are considered. This embodiment of the method for measuring or plotting resistance profiles is not limited to the aforedescribed examples considered in detail. Relatively complex profiles such as depicted in FIGURE 3 can be determined.

Figure 9:
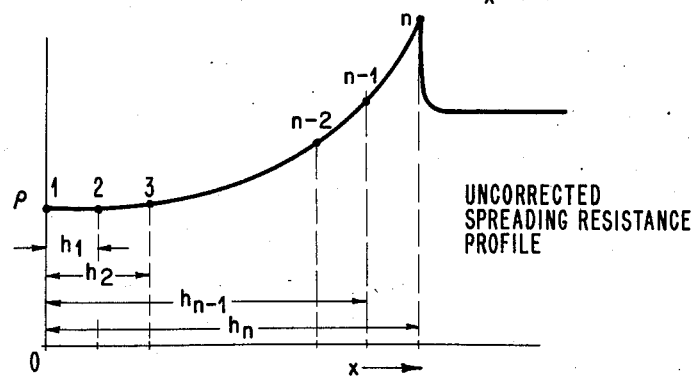
FIGURE 9 is a plot of resistivity versus depth illustrating resistivity points and layer thicknesses utilized in the second embodiment of the method of the invention.

A second embodiment of the method of determining resistivity profiles involves dividing the device into $n$-layers where $n$ varies between 20 and 50. It is assumed that each layer has a constant resistivity given by the spreading resistance value for that layer. The starting point is indicated as point 1 on FIGURE 9 and is normally immediately adjacent the surface of the device although it need not be. The voltage measured at each point is given by the expression $$V = \frac{I\rho}{4a} \text{ C.F.}$$

where the correction factor C.F. is defined by the same expression given above. Further $$_n\theta_1' = \frac{A_n}{B_n}$$

where $A_n$ and $B_n$ are defined previously.

It can be surmised that the procedure for correcting a given profile becomes quite complicated. For practical usage of the method, a computer is utilized for the detailed calculations of correction factors.

The spreading resistivity $\rho_{10}$ at the first point is corrected by dividing the experimental resistivity value by the correction factor as defined by the expression $$\rho_{10} \text{ (Corrected)} = \rho_{10}/\text{C.F.}, \cdot \text{ Once } \rho_{10}$$

is corrected it is ignored for the rest of the calculations and the remaining layer is again broken up into 20 to 50 layers as was done for the original case. The same basic procedure is followed in determining the corrected resistivity at point 2. This procedure is continued until a junction is reached or, in the case of an epitaxial layer on a substrate, until the constant resistivity region is obtained.

The basic procedure followed in determining the correction factor at each point is to assume the resistivity is constant in each of the layers $h_1$ through $h_n$. The assumed resistivity for the layer $h_n$ is the uncorrected resistivity determined at point $n$, the assumed resistivity of $h_{n-1}$ is the uncorrected resistivity determined at point $n-1$, etc. As indicated on FIGURE 9, the various designated layers are superimposed. The entire procedure is repeated until the profile thus attained no longer changes with additional corrections.

A final corrected resistivity profile can be corrected to an impurity profile using Irvin's curve.

Figure 7:
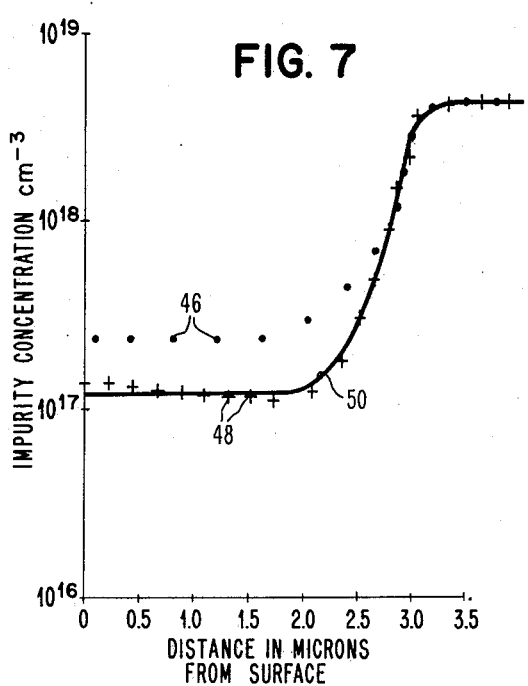
FIGURE 7 is an impurity profile of an epitaxial layer deposited on a wafer having a uniform impurity concentration on which is indicated the impurity concentration based on apparent resistivity, the corrected or actual impurity concentration and the calculated impurity concentration.

FIGURE 7 indicates a typical impurity profile obtained from practicing the method of the invention. The series of spaced points indicated by numeral 46 are apparent impurity concentrations at the indicated locations in the device which were calculated directly from apparent resistivity or uncorrected resistivity measurements made by the spreading resistance technique. The series of spaced points indicated by numeral 48 are actual impurity concentrations at the indicated locations in the device which were calculated directly from corrected resistivity values. Curve 50 is a line fitted to the corrected resistivity values.

While the invention has been particularly shown and described with reference to a preferred embodiment thereof, it will be understood by those skilled in the art that various changes in form and detail may be made therein without departing from the spirit and scope of the invention.

What is claimed is:

1. A method of determining the resistivity profile of a semiconductor device comprising:
   exposing at least a portion of the region of the device to be investigated,
   establishing and measuring a current flow in the device with spaced probes in contact with the surface of the exposed region,
   measuring the spreading resistance voltage with a voltage probe at a first point on the device in the same region of the current flow,
   determining the apparent resistivity of the material of the device at the first point in accordance with the expression $$\rho = \frac{4aV}{I}$$

where $\rho$ is the apparent resistivity, V is the measured potential difference, I is the measured current flow, and $a$ is the effective radius of the voltage probe, measuring spreading resistance voltage and determining the apparent resistivity at a second point spaced from the first point, mathematically applying a correction factor to the apparent resistivity determination of the second point which is based at least in part on the information of apparent resistivity of the first point, and the distance between the first and second points to determine an actual resistivity determination for said second point, measuring the spreading resistance voltage at successively spaced points, determining the apparent resistivities, and mathematically applying a correction factor to the apparent resistivity determinations based on the information about the preceding point determinations of actual resistivity and the relative locations of such resistivities on the device, and continuing to measure spreading resistance voltages at spaced points and determining apparent resistivities at such points, and mathematically applying correction factors which are each based on preceding measured resistivity point values to the apparent resistivity values until the region of interest of the device has been traversed.

2. The method of claim 1 wherein the apparent resistivity is determined by, determining and expressing the relationship between spreading resistance as defined by $V/I$ and resistivity of a plurality of semiconductor wafers of known impurity concentrations extending over the range of interest, utilizing the resulting relationship and the determined spreading resistance values of each point to determine the apparent resistivity thereof.

3. The method of claim 1 wherein each determination of actual resistivity is revised by evaluating and taking into account the effective radius $a$ of the voltage probe comprising, measuring V with a voltage probe and I, and determining the relationship between spreading resistance as defined by $V/I$ for a plurality of semiconductors with known uniform resistivities extending over the range of interest, determining the values of effective radius $a$ of the voltage probe for the various values of resistivity of the known semiconductors in accordance with the expression $$\rho = 4a \frac{V}{I}$$

where $a$ is the only unknown, calculating a new value for effective radius $a$ from a consideration of the value of actual resistivity $\rho$ and spreading resistance $V/I$, determining a revised correction factor embodying the resultant value for effective radius, applying the revised correction factor to determine revised actual resistivity, applying the revised actual resistivity value to each subsequent spreading resistance voltage measurement.

4. The method of claim 1 wherein the region of the device to be investigated is exposed by beveling the device.

5. The method of claim 1 wherein the region of the device to be investigated is exposed by removal of a thin layer prior to each measurement of spreading resistance voltage.

6. The method of claim 1 wherein said first point is located on a PN junction and the successive points are each spaced therefrom in a general direction toward the surface of the device by a finite distance.

7. The method of claim 1 wherein said first point is located in a region in the device having a substantially uniform impurity distribution of relatively large thickness, and the successive points are each spaced therefrom in a general direction toward the surface of the device by a finite distance.

8. A method of determining the resistivity profile of a semiconductor device comprising;

beveling the region of the device to be investigated, establishing and measuring a current flow in the device with spaced probes in contact with the surface of the exposed region, measuring spreading resistance voltages with a voltage probe in contact with the surface at a series of spaced points traversing the region of the device to be investigated, determining values of apparent resistivity in accordance with the expression $$\rho = \frac{4aV}{I}$$

where $a$ is the effective radius of the voltage probe, V is the measured voltage potential, and I is the measured current flow, dividing the device into a plurality of layer regions and determining an average apparent resistivity for each layer region, determining the actual resistivity of the first layer region by mathematically applying a correction factor to the apparent resistivity value, which correction factor is based at least in part on the average apparent resistivity values of at least a plurality of the layer regions, and the thickness thereof, and determining the actual resistivity of each of the remaining layers by mathematically applying a correction factor based on the average apparent resistivity values of the remaining layer regions, and thicknesses.

9. The method of claim 8 wherein the apparent resistivity is determined by, determining and expressing the relationship between spreading resistance as defined by $V/I$ and actual resistivity of a plurality of semiconductor wafers of known impurity concentrations extending over the range of interest, utilizing the resulting relationship and the determined spreading resistance values of each point to determine the apparent resistivity thereof.

10. The method of claim 8 wherein each determination of actual resistivity is revised by evaluating the effective radius $a$ of the voltage probe comprising, measuring V with a voltage probe and I, and determining the relationship between spreading resistance as defined by $V/I$ and actual resistivity of a plurality of semiconductors with known uniform resistivities extending over the range of interest, determining the values of effective radius $a$ of the voltage probe for the various values of resistivity of the known semiconductors in accordance with the expression $$\rho = \frac{4aV}{I}$$

where $a$ is the only unknown, calculating a new value for effective radius $a$ from a consideration of the value of actual resistivity $\rho$ and spreading resistance $V/I$, determining a revised correction factor embodying the resulting value for effective radius, applying the revised correction factor to determine revised actual resistivity, applying the revised actual resistivity value to each subsequent spreading resistance voltage measurement.

11. The method of claim 8 wherein the actual resistivity values of the plurality of layer regions are subsequently revised by applying correction factors thereto based on the previously corrected average actual resistivity values, which correction is repeated until said resistivity values are substantially stabilized.

References Cited

Duffy, M. C., and R. L. Hudson, Junction Depth Measurement, IBM Technical Disclosure Bulletin, (9) 11, April 1967, pp. 1646–47.

Gardner, E. E., and P. A. Schumann, Jr., Measurement of Resistivity of Silicon Epitaxial Layers by the Three-Point Probe Technique, Solid State Electronics, (8), pp. 165–174, 1965.

Gardner, E. E., P. A. Schumann, Jr. and E. F. Gorey, Resistivity Profiles and Thickness Measurements on Multilayered Semiconductor Structures by the Spreading Resistence Technique, Measurement Techniques for Thin Films—Symposium of Electrochimical Society Proceedings, Philadelphia, Pa., October 1966, Published May 1967, pp. 258–272.

EDWARD E. KUBASIEWICZ, Primary Examiner

J. M. HANLEY, Assistant Examiner